United States Patent [19]

Bernier et al.

[11] Patent Number: 4,910,295

[45] Date of Patent: Mar. 20, 1990

[54] PROCESS FOR REDUCING THE ODOR OF ETHYLIDENE NORBORNENE PRESENT IN EPDM RESIN

[75] Inventors: Robert J. Bernier, Flemington, N.J.; George E. Keller, II, South Charleston, W. Va.

[73] Assignee: Union Carbide Chemicals and Plastics Company Inc., Danbury, Conn.

[21] Appl. No.: 344,760

[22] Filed: Apr. 28, 1989

[51] Int. Cl.$^4$ .................. C08F 6/28; C08F 236/20
[52] U.S. Cl. .................. 528/482; 528/490; 528/501; 528/502; 526/282; 524/450; 524/579
[58] Field of Search .............. 528/482, 501, 502, 490; 526/282; 524/450, 579

[56] References Cited

U.S. PATENT DOCUMENTS

| | | | |
|---|---|---|---|
| 3,236,806 | 2/1966 | Dunham, Jr. | 524/450 X |
| 4,016,349 | 4/1977 | McKenna | 528/482 |
| 4,591,633 | 5/1986 | Suzuki et al. | 524/450 X |
| 4,795,482 | 1/1989 | Gioffre et al. | 55/75 |

FOREIGN PATENT DOCUMENTS

| | | | |
|---|---|---|---|
| 224332 | 7/1985 | German Democratic Rep. | 252/9 |
| 242047 | 1/1987 | German Democratic Rep. | 525/332.5 |
| 5253999 | 4/1977 | Japan | 528/482 |

OTHER PUBLICATIONS

Translation of Japanese Kokai Pat. No. 56-110704 to Ichikawa et al., published Sep. 2, 1981.

*Primary Examiner*—Joseph L. Schofer
*Assistant Examiner*—F. M. Teskin
*Attorney, Agent, or Firm*—Clement J. Vicari

[57] ABSTRACT

A process for reducing the odor of ethylidene norbornene present in EPDM resin which comprises introducing a crystalline siliceous molecular sieve into said EPDM resin in an amount sufficient to reduce the odor produced by ethylidene norbornene present in said EPDM resin.

10 Claims, 1 Drawing Sheet

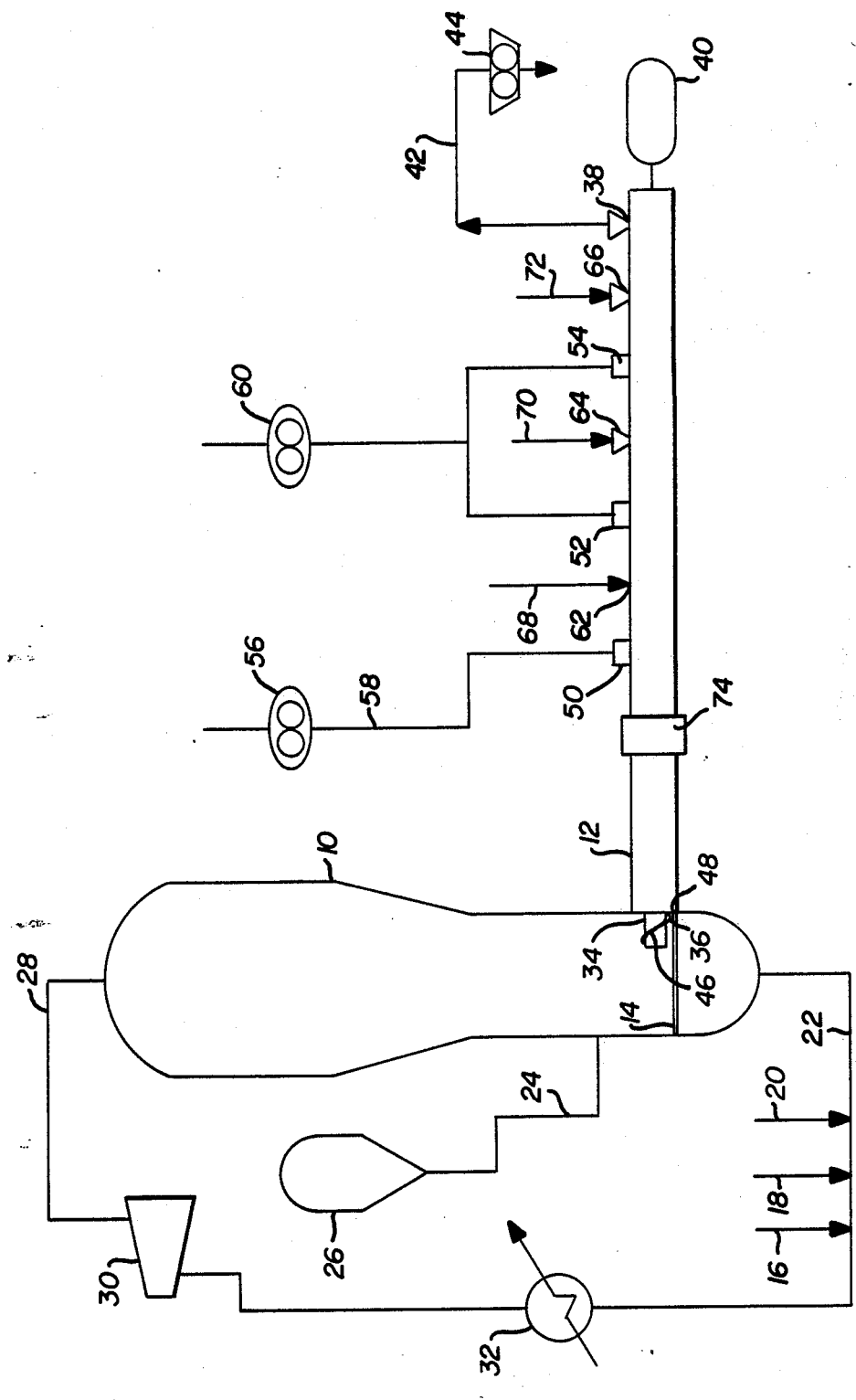

PROCESS FOR REDUCING THE ODOR OF ETHYLIDENE NORBORNENE PRESENT IN EPDM RESIN

BACKGROUND OF THE INVENTION

1. Field of the Invention

The present invention relates to gas fluidized bed processes for producing ethylene propylene diene monomer resins which contain ethylidene norbornene therein and more particularly to a process for reducing the odor of ethylidene norbornene present in such resins.

2. Description of the Prior Art

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefin polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions. More recently, the gas phase fluid bed reactor has been extended to the production of rubbery resins such as ethylene propylene diene monomer such as disclosed in U.S. Pat. No. 4,710,538 issued Dec. 1, 1987.

Ethylene propylene diene monomer (EPDM) resins are presently produce by a variety of techniques. In certain processes for producing EPDM resins, the amount of ethylidene norbornene monomer remaining in the finished polymer, (i.e, after completion of the devolatilization process to remove the monomer from the polymer,) in a free form is such as to cause objectionable odors.

Thus when producing and recovering EPDM resin according to certain of the above processes, there still exists a somewhat objectionable odor in the resins product. This is primarily due to the fact that ethylidene norbornene (ENB), a monomer used for sulfur curable ethylene propylene rubbers, has a very distinctive an objectionable odor and is present in minute quantities in the finished product. Ethylidene norbornene can be detected by humans at concentrations as low as 14 ppbv. For example, in a typical fluidized bed process EPDM resins contain as much as 5% by weight of dissolved ENB. Conventional procedures for removing ENB are still not satisfactory for reducing the ENB content to acceptable levels.

Zeolites in general have been employed in the past for removal of residual isocynate from urethane polymers (See Japanese Kokai JP 52/53999 [77/53999], 30 Apr. 1977.

Hungarian Patent HU 41425A2, issued Apr. 28, 1987 discloses the use of zeolites as dielectricheating promoters, for cross-linking of rubber and polyolefin compounds by microwave irradiation.

Zeolites have also been disclosed as fillers for synthetic rubbers in tire manufacturing and zeolite amine adducts have been employed to improve the properties resulting from the curing process of sulfur based rubber compounds as well as the vulcanization rates of such products (see for example East German patent DD 242047 and DD 224322 issued 14 Jan. 1987 and 3 July 1985 respectively).

U.S. Pat. No. 4,795,482 issued to Gioffre et. al. on Jan. 3, 1989 and assigned to Union Carbide Corporation discloses a process for eliminating organic odors. Removal of ENB odors resulting from a gas fluidized bed process for producing EPDM resins nor the specific manner of introducing said materials is not disclosed or suggested.

It has been discovered that a specific type of zeolite when utilized in a particular manner is extremely effective in reducing the amount of ethylidene norbornene present in EPDM resins.

SUMMARY OF THE INVENTION

Broadly contemplated, the present invention provides a process for reducing the odor of ethylidene norbornene present in EPDM resin which comprises introducing a siliceous molecular sieve into said EPDM resin in an amount sufficient to reduce the odor of ethylidene norbornene present in said EPDM resin.

In an aspect of the invention the siliceous molecular sieve can be utilized by contacting the EPDM rubber with the siliceous molecular sieve in an amount and for a time sufficient to reduce the ENB odor levels to acceptable levels.

In the case where the EPDM resin is produced in granular form by a gas fluidized bed process such as disclosed in U.S. Pat. No. 4,372,758 the siliceous molecular sieve can b admixed with the granular material after the purging or devolatilization process.

In the case where the EPDM resin is produced in granular form and then melted to produce polymer pellets, such as in the process disclosed in copending application Ser. No. 213,095 filed on June 28, 1988 in the names of R. J. Bernier, J. O. Buhler-Vidal, U. S. Haapala and B. R. Rosenblat and which is assigned to a common assignee, the siliceous molecular sieve can be added to the EPDM resin in molten form in the extruder following the devolatilization process performed in the extruder.

BRIEF DESCRIPTION OF THE DRAWING

The sole FIGURE is a schematic illustrating equipment for practicing the invention.

DESCRIPTION OF THE PREFERRED EMBODIMENTS

Although the invention can be practiced in connection with any process typically employed to produce EPDM resins containing free ethylidene norbornene therein, the invention is however preferably applicable in connection with EPDM resins produced by the gas fluidized bed reaction process.

The crystalline siliceous molecular sieve employed according to the invention is one in which at least about 90%, and preferably at last about 95% of the framework tetrahedral oxide units are $SiO_2$ tetrahedral and which have a sorptive capacity for water at 25° C. and 4.6 torr of less than 10 weight percent. In the case of aluminosilicate molecular sieves, those useful in the practice of the invention have a framework $SiO_2/Al_2O_3$ molar ratio of from about 35 to infinity, and preferably from 200 to 500. All of the siliceous molecular sieves suitably employed have a pore diameter of at least 5.5 Angstroms, preferably at least 6.2 Angstroms. Preferably the adsorption capacity for water vapor at 25° C. and a water vapor pressure of 4.6 torr is less than 6 weight percent.

Further descriptions of this material and the method of preparation is disclosed in U.S. Pat. No. 4,795,482 which is incorporated herein by reference. The commercial material is available under the trademark "Smellrite" from Union Carbide Corporation.

The amount of siliceous molecular sieves utilized depends on the amount of ENB present in the resin. In general, however, amounts in the range of about 0.05% to about 100%, preferably about 1% to about 3% based on the weight of polymer resin can be utilized.

The fluidized bed reactor can be the one described in U.S. Pat. No. 4,482,687 or another conventional reactor for the gas phase production of, for example, polyethylene or ethylene copolymers and terpolymers. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make up feed, and cycle (recycle) gas, i.e., monomer and, if desired, modifiers and/or an inert carrier gas. The fluidizing gas can also be a halogen or sulfur dioxide or other reactive gas. A typical cycle gas is comprised of ethylene, nitrogen, hydrogen, and propylene, butene, or hexene monomers, either alone or in combination.

When employing the above reactor, the siliceous molecular sieve can be added to the EPDM resin after the purging step disclosed in the patent.

The most preferred process for producing EPDM polymer is described in the above referred to copending application Ser. No. 213,095 which is incorporated herein by reference.

Briefly stated however and referring to the sole FIGURE there is shown fluid bed reactor 10 directly coupled to extruder 12. Reactor 10 is provided with a conventional distributor plate 14 disposed slightly below extruder 12. Cocatalyst, monomer and comonomers are introduced into reactor 10, through lines 16, 18 and 20 respectively through lines 22 and into reactor 10, and catalyst is introduced through line 24 from catalyst feeder 26. Recycle gas is discharged from reactor 10, through line 28 and passes through compressor 30, cooler 32 and joins the feeds entering line 22 from lines 16, 18 and 20.

The preferred type of extruder is a twin screw extruder although a single screw extruder is also operable. The twin screw extruder is commercially available from a variety of sources such as Werner Pfleiderer Corp., Berstorff Corp. and Welding Engineers and provides excellent devolatilization performance and mixing characteristics.

There are many acceptable ways to connect the cavity of extruder 12 with reactor 10. Direct coupling can be achieved by having the screw 34 of the extruder protruding partly inside the fluid bed as shown in FIG. 1. In this configuration, the commercial extruder is modified so that the normal rotation of the screw is reversed. The extruder is further modified in that the discharge end conventionally associated with the extruder becomes its inlet end and the inlet end becomes the discharge end. Thus in the drawing reference numeral 36 illustrates the inlet end and 38 the outlet or discharge end. The drive train 40 of extruder 12 can be located away from the extruder near discharge end 38 where the polymer melt changes direction by means of a 90° elbow (not shown) before being fed through line 42 to melt pump 44. Line 42 represents a heated conduit to maintain polymer melt in the molten state. The resin throughput is controlled by the screw rotational speed. It is also regulated by the lead of the screw element located in the fluid bed and extruder interface. For example, a reduction in the extruder throughput can be achieved by reducing the lead 46 at the reactor wall 48.

The length of the extruder is determined from a compromise between the necessity of accomplishing all the tasks require for a complete post reaction treatment of the resin and the need to limit the energy input to the polymer. The minimum length of the extruder is usually set by the devolatilization requirements of the product Heavy residue monomers such as ethylidene norbornene dissolved in EPDM resins are difficult to remove and require a longer residence time of the resin in the extruder.

Extruder 12 is also provided with three vents represented by reference numerals 50, 52, and 54.

Vent 50 is in vacuum communication with vacuum pump 56 through line 58. In similar manner, vents 52 and 54 are in vacuum communication with vacuum pump 60. Vacuum pump 56 and 60 are conventional and commercially available in the art. They are designed to provide vacuum of from about 200 millimeters of mercury to about a few millimeters of mercury.

Extruder 12 is also provided with injection ports for introducing additives to the extruder. Thus injection ports 62, 64, and 66 are disposed in the extruder in a manner such that port 62 receives a catalyst deactivating agent such as water through line 68 for deactivating catalyst and foaming the polymer melt to improve devolatilization efficiency. Port 64 receives necessary additives through line 70 and port 66 receives any optional additives through line 72. It is to be understood however that port 64 can also be utilized to receive water or stripping agents in which case additives would then be introduced solely through port 66.

The location of vents 50, 52 and 54 are such as to define vent stages or zones corresponding to a first vent stage or zone for vent 50, a second stage or zone for vent 52 and a third stage or zone for vent 54. Each stage or zone is isolated from one another by molten polymer seals. In co-rotating intermeshing twin screw extruder, molten polymer seals between each zone can be effected by compression of the resin polymer melt utilizing a combination of decreasing pitch and reverse pitch segments of the extruder screws as is known in the art. Cylindrical inserts critically located on the extruder screw of counter rotating non-intermeshing extruders are also known to provide efficient polymer melt seals.

A seal with the molten polymer in the extruder must be established in order to separate the pressure from the seal into the reactor from the pressure from the seal in a direction away from the reactor. This can be accomplished in a variety of ways and would depend primarily on the type of extruder utilized. For example, in a co-rotating intermeshing twin screw extruder, one technique is to use reverse screw elements to provide the variant pressures to effect the seal of the molten polymer. Referring again to FIG. 1 of the drawing the seal represented by reference numeral 74 is generally effected prior to vent 50 so as to provide an upstream zone running from the seal into the reactor, and a downstream zone running from the seal towards the discharge end 38.

The pressurized chamber of the fluidized bed reactor 10 is isolated from the vacuum applied at the first vent stage of extrude 12 by means of the sealing action of the molten polymer. In a counter rotating non intermeshing twin screw extruder, the seal is created by restricting the cross section available for the polymer flow. The restriction can be effected by cylindrical elements (not shown) mounted side by side on each screw shaft. The clearance of these cylindrical elements with the extruder barrel and the viscosity of the molten polymer determine the pressure generated in that zone. In general, the clearance is chosen so as to create a pressure equal to twice the reactor pressure. In a co-rotating intermeshing twin screw extruder the high pressure of the sealing zone is obtained with the use of reverse screw elements which actively increase the resistance to the melt flow. Although designed for intermeshing applications, a valve such as described in German Patent DE 30 42 427 having twelve throttle pins in the transverse plane to vary the flow cross section can also be used to generate the high pressure zone in the resin melt.

The preferred method to effect the molten polymer seal is to utilize an automatic valve of the type disclosed in copending application Ser. No. 213,09 filed June 28, 1988 and assigned to a common assignee, the teaching of which is incorporated herein by reference. The valve disclosed therein maintains a constant pressure in the melt seal zone regardless of the extruder screw speed and polymer melt viscosity. This is achieved by controlling the cross-section available for the flow of the molten polymer via the melt seal pressure feedback on the valve servo-mechanism. The range of operability is greatly extended by the use of this device.

As mentioned previously, extruder 12 is preferably equipped with three vented stages defined by vents 50, 52 and 54 and which are maintained under vacuum to remove efficiently monomers dissolved in the polymer melt. Devolatilization in the first stage is effected without the aid of stripping agents. The benefits associated with the use of a stripping agent are to foam the polymer melt to increase the surface area available for the diffusion of monomer residues and to lower the partial vapor pressure in the cavity of the vented stage in order to increase the driving forces controlling the desorption process.

Foaming in the first stage (defined by vent 50) occurs naturally because of the relatively large amount of dissolved monomers contained in the resin. Foaming is also enhanced by the entrainment of interstitial gas having the composition of the cycle gas with the resin particles. The entrained gas is trapped as the solid polymer is molten in the extruder and forms micro bubbles which expands when exposed to the low pressure level of the first devolatilization stage.

An advantage of not using a stripping agent in the first stage is that it is possible to recycle the vent effluent directly to the reactor through the intermediary of a compression step. Since approximately 98% of all monmer residues are recovered in the first stage, a significant economy is realized on the size of the separation unit. Thus, the gaseous effluent leaves vent 50 through line 58 and is re-introduced into reactor 10.

The amount of volatiles remaining in the polymer melt after the first stage are low. To increase the devolatilization efficiency, a stripping agent is injected in the molten polymer through line 68. The preferred agent is water although other compounds such as isopropyl alcohol have proven to be effective in enhancing the devolatilization rate of monomer residues. Water is also preferred because it deactivates catalyst and cocatalyst residues contained in the polymer melt. Deactivation of the catalyst and cocatalyst residues are a necessary step before attempting to incorporate additives in the resin melt aimed at stabilizing the product or modifying the properties.

The second devolatilization stage defined by vent 52 is isolated from the first by means of a melt seal in a manner similar to the one described for isolating the pressurized reactor. However, the requirements regarding the pressure level are of a lesser degree. Nevertheless, the molten seal should extend over injection port 62 to ensure good incorporation in the resin melt and avoid contamination of vent 50. The vent effluent of the second stage is directed to a separation unit (not shown) where water is removed from the monomer residues and reused as a stripping agent. Water is added to the close loop system to account for losses due to the hydrolysis of the catalysts and cocatalysts residues.

A third devolatilization stage defined by vent 54 is provided to reduce the monomer residues to the desired level in accord with the safety requirement of the product and the environmental regulations. Isolation of the third stage from the second stage is necessary if a stripping agent is needed to complete the devolatilization process.

The crystalline siliceous molecular sieves can be added either individually or with other resin additives normally employed in the art. Thus, the siliceous molecular sieves can be added individually or with other resins additives through line 70 to the molten polymer preferably at a location between the second stage and the third stage when the injection of a stripping agent is not necessary. Otherwise, the mixing of the additives is carried out after the third vent through line 72. Liquid additives are continuously injected as a side stream in a region of intense mixing of the molten polymer. Similarly solid additives are incorporated in the molten polymer stream by means of a feeder in the absence of oxygen and under an inert atmosphere.

In addition to the siliceous molecular sieves, other additives which can be utilized in the invention are conventional in the art. Merely as illustrative, the following other additives can be employed: tetrakis [methylene (3,5-di-tert-butyl-4-hydroxy-hydrocinnamate)] methane (Irganox 1010) available from Ciba Geigy Corporation, Hawthorne, N.Y.; tris (2,4-di-tert-butylphenyl) phosphite (Irgafos 168) available from Ciba Geigy Corporation, Hawthorne, N.Y. and zinc oxide.

The following Example 1 illustrates the reduction of odor of EPDM resins due to the reduction of EENB available for diffusion out of the polymer resin.

EXAMPLE 1

A mixture of ethylene propylene, and ethylidene norbornene (ENB) is continuously polymerized in fluid bed reactor according to the process disclosed in copending application Ser. No. 213,095 under the action of a titanium based catalyst in the presence of an aluminum alkyl acting as a cocatalyst. The conditions in the reactor are as indicated in Table II below:

TABLE I

| Reactor Conditions | |
|---|---|
| Temperature | 30° C. |
| Pressure | 300 psig |
| $C_2H_4$ concentration | 45.8 psia |
| $C_3/C_2$ mol ratio | 2.49 |
| $H_2/C_2$ mol ratio | 0.56 |
| Ethylene norbornene feed weight % | 5.5 |
| Cycle gas velocity (feet/second) | 2.2 |
| Space time yield (pound/hour/cubic feet) | 1.5 |
| Cocatalyst concentration ppm by weight | 1789 |
| Residence time | 7.6 hours |

The polymerized solid particles have the following properties as indicated in Table II:

TABLE II

| EPDM Resin Properties: | |
|---|---|
| Density (g/cc) | .876 |
| Melt Index (decigram/minute) | .43 |
| Melt Flow Ratio | 38.5 |
| Propylene Incorporation (% by weight) | 33.2 |
| Ethylidene norbornene incorporation (% by weight) | 3.4 |
| Titanium residues | 23.3 |

The polymerized solid particles are removed from the reactor continuously by means of a screw feeder discharging directly in a twin feed extruder. The extruder has two vented stages in series maintained under vacuum to effect the devolatilization of monomer residues. The monomer residues composition of the polymer resin entering and leaving the extruder are as indicated in Table III below:

TABLE III

| Monomer Residues Dissolved in the EPDM Resin | |
|---|---|
| (a) Reactor exit/extruder inlet | |
| ethylene | 2,865 ppmw |
| propylene | 69,652 ppmw |
| ENB | 21,000 ppmw |
| (b) First vented stage exit | |
| ethylene | traces |
| propylene | 2,786 ppmw |
| ENB | 1,750 ppmw |
| (c) Second stage vented stage | |
| ethylene | traces |
| propylene | 175 ppmw |
| ENB | 200 ppmw |

The following Example 2 illustrates the present invention wherein the additive of the present invention is added to the molten resin.

EXAMPLE 2

The procedure of Example 1 is repeated except that "Smellrite" additive is introduced at a rate of 1% by weight of the extruder resin throughout and compounded in the molten polymer through line 70 of FIG. 1. The resin is then subjected to headspace gas chromatography analysis and indicates a reduction of the ENB available for diffusion from about 200 ppmw to about 100 ppmw.

What is claimed is:

1. A process for reducing the odor of ethylidene norbornene present in EPDM resin which comprises introducing a crystalline-siliceous molecular sieve having a pore diameter of at least 5.5 Angstroms into said EDM resin in an amount sufficient to reduce the odor produced by ethylidene norbornene present in said EPDM resin.

2. A process according to claim 1 wherein said EPDM resin is produced by a gas fluidized bed process.

3. A process according to claim 2 wherein said siliceous molecular sieve is added to said EPDM resin after completion of a devolatilization process for reducing the amount of ethylidenenorbornene residues dissolved in the polymer resin.

4. A process according to claim 3 wherein said siliceous molecular is added to said EPDM resin when said EPDM resin is in a molten state.

5. A process according to claim 2 wherein said siliceous molecular sieve is employed in an amount of about 0.5% to about 100% based on the weight of the polymer resin.

6. A process according to claim 2 wherein said siliceous molecular sieve is employed in an amount of about 1% to about 3% based on the weight of the polymer resin.

7. A process for reducing odor of ethylidenenorbornene present in EPDM resin wherein said EPDM resin is produced in granular form by a gas phase fluidized bed process, and thereafter melted to produce polymer pellets, which comprises adding a siliceous molecular sieve having a pore diameter of at least 5.5 Angstroms to said polymer melt in an amount sufficient to reduce the odor produced by said ethylidenenorbornene present in said EPDM resin.

8. A process for the post reaction treatment of EPDM resins produced by fluidized bed polymerization of alpha olefins and which contain ethylidene norbornene present in said resin causing objectionable odor to be imparted to said resins which comprises:
 (a) providing a screw extruder in communicating contact with said fluidized bed, said screw extruder being adapted to receive EPDM polymer particle resins from said fluidized bed,
 (b) removing polymerized EPDM product resin from said fluidized bed by the action of said screw extruder in communication with said fluidized bed,
 (c) melting said EPDM resin in said extruder to form molten polymer,
 (d) effecting a seal with said molten polymer in said extruder to provide an upstream zone from said seal into said reactor and a downstream zone from said seal in a direction away from said reactor, said seal isolating the pressure in said upstream zone from said downstream zone,
 (e) devolatilizing monomer residues and volatiles dissolved in said EPDM polymer melt by venting said monomer residues and volatiles from said extruder,
 (f) deactivating catalyst and cocatalyst residues by introducing a deactivating agent to said extruder,
 (g) adding additives in the absence of oxygen to said extruder containing said polymer melt; steps (e) through (g) being conducted in said downstream zone,
 (h) adding a siliceous molecular sieve having a pore diameter of at least 5.5 Angstroms to said polymer melt in said downstream zone in an amount sufficient to reduce the odor produced by said ethylidenenorbornene and (i) discharging treated polymer product from said extruder.

9. A process according to claim 8 wherein said siliceous molecular sieve is employed in an amount of about 0.5% to about 100% based on the weight of the polymer resin.

10. A process according to claim 8 wherein said siliceous molecular sieve is employed in an amount of about 1% to about 3% based on the weight of the polymer resin.

* * * * *